(12) United States Patent
Pang

(10) Patent No.: US 6,594,301 B2
(45) Date of Patent: Jul. 15, 2003

(54) TUNABLE MODELOCKED ULTRAFAST LASER

(75) Inventor: Yang Pang, San Jose, CA (US)

(73) Assignee: Coherent, Inc., Santa Clara, CA (US)

( * ) Notice: Subject to any disclaimer, the term of this patent is extended or adjusted under 35 U.S.C. 154(b) by 40 days.

(21) Appl. No.: 09/813,507

(22) Filed: Mar. 21, 2001

(65) Prior Publication Data

US 2002/0136245 A1 Sep. 26, 2002

(51) Int. Cl.[7] .............................. H01S 3/08; H01S 3/081
(52) U.S. Cl. .......................... 372/100; 372/93; 372/92
(58) Field of Search .......................... 372/18, 92, 93, 372/20, 100; 359/300

(56) References Cited

U.S. PATENT DOCUMENTS

| | | | |
|---|---|---|---|
| 5,079,772 A | | 1/1992 | Negus et al. ............... 372/18 |
| 5,097,471 A | * | 3/1992 | Negus et al. ............... 372/18 |
| 5,173,908 A | * | 12/1992 | Negus et al. ............... 372/18 |
| 5,212,698 A | * | 5/1993 | Kafka et al. ............... 372/18 |
| 5,235,605 A | * | 8/1993 | Rines et al. ............... 372/20 |
| 5,307,358 A | * | 4/1994 | Scheps ........................ 372/20 |
| 5,365,366 A | * | 11/1994 | Kafka et al. ............. 359/330 |
| 5,572,358 A | | 11/1996 | Gabl et al. ................ 359/347 |
| 5,799,025 A | * | 8/1998 | Lai et al. ..................... 372/18 |
| 5,815,519 A | * | 9/1998 | Aoshima et al. ........... 372/25 |
| 5,847,861 A | * | 12/1998 | Kafka et al. ............. 359/330 |
| 5,953,354 A | * | 9/1999 | Staver et al. .............. 372/18 |
| 6,038,055 A | * | 3/2000 | Hansch et al. ........... 359/279 |
| 6,181,724 B1 | * | 1/2001 | Tanaka et al. ............. 372/57 |
| 6,288,832 B1 | * | 9/2001 | Richman et al. ......... 359/330 |
| 6,317,449 B1 | * | 11/2001 | Zanger et al. ............ 372/100 |
| RE38,039 E | * | 3/2003 | Kleinschmidt et al. ..... 372/100 |

\* cited by examiner

Primary Examiner—Quyen Leung
Assistant Examiner—Phillip Nguyen
(74) Attorney, Agent, or Firm—Stallman & Pollock LLP

(57) ABSTRACT

An automatically-tunable, ultrafast laser delivers ultrashort pulses having a duration a few picoseconds or less. The laser has a laser resonator including an optically-pumped gain-medium providing optical gain over a gain-bandwidth characteristic of the gain-medium. The resonator includes one or more groups of group-delay-dispersion compensating prisms. One or more prisms in each group is moveable with respect to one or more others. A stop is arranged, cooperative with the group of prisms, to select a pulse wavelength within the gain-bandwidth. Tuning of the selected pulse-wavelength is accomplished by moving the moveable prism or prisms cooperative with the stop. The prism motion and the spatial relationship of the prisms with the stop is arranged such that the optical path length in the prisms for all selected lasing wavelengths is about the same. This provides that changes in characteristics of the output-pulses are minimized as the pulse wavelength is varied.

6 Claims, 4 Drawing Sheets

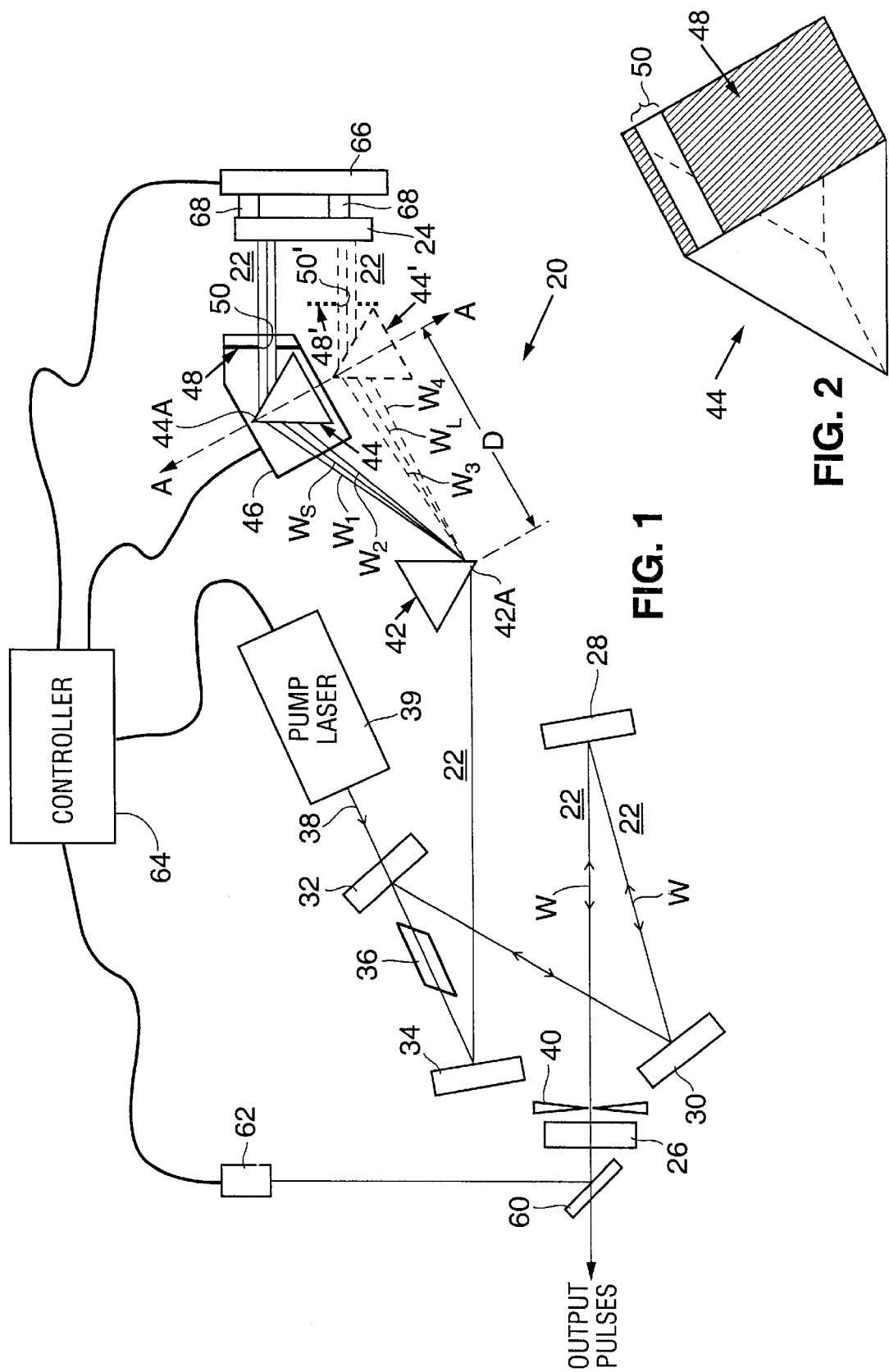

TUNABLE MODELOCKED ULTRAFAST LASER

TECHNICAL FIELD OF THE INVENTION

The present invention relates in general to lasers (ultrafast lasers) which deliver radiation as a sequence of ultrashort pulses having a duration from a few picoseconds (ps) to as short as a few femtoseconds (fs). The invention relates in particular to automatic tuning of modelocked ultrafast lasers while minimizing changes in pulse characteristics thereof.

DISCUSSION OF BACKGROUND ART

Modelocked ultrafast lasers employing a solid state-gain-medium such as Ti:sapphire can be tuned over a relatively wide range of wavelengths. By way of example, a Ti:sapphire laser can be tuned from about 700 nanometers (nm) to about 1000 nm. A preferred modelocking method for such a laser is Kerr lens modelocking (KLM).

The broad tuning range and the modelocked, ultrashort pulses delivered by such lasers find application in several branches of science including materials processing, spectroscopy, medicine and biology. There are several technical problems, however, which complicate tuning an ultrafast laser over the full wavelength range characteristic of the laser gain-medium.

One problem is that the laser gain varies over the full tuning range of the laser. For a KLM, Ti:sapphire laser, intracavity power has to be held with a certain range to maintain stable, modelocked operation. Because of this, as the laser is tuned, pump-power to the gain-medium must be adjusted to compensate for the variation in gain. Tuning is often accomplished by providing an adjustable wavelength selective device, such as a birefringent filter (BRF), in the laser cavity. Pump power must be lowered or raised as gain respectively increases or decreases in response to a tuning adjustment.

A second problem is that in an ultrafast laser some compensation must be provided for group-delay-dispersion compensation of spectral (wavelength) components of a pulse. Such compensation is required to prevent broadening of pulses due to differing circulation times in the laser resonator for different wavelength components of the pulse. In a broadly tunable laser, group-delay-dispersion compensation is usually provided by one or more prism pairs. These prisms cause the different wavelength components of a pulse to have different optical path lengths in the laser cavity.

As the nominal wavelength (center wavelength of the wavelength components of the pulse) of the laser is tuned, however, the intracavity laser beam dispersed by a first prism of a pair is incident on the second prism of the pair at different positions and follows a different path through the prism. This difference can be sufficient that group-delay-dispersion compensation characteristics of the prism pair at different tuning (center) wavelengths are sufficiently different that pulse characteristics of the laser, such as temporal shape, bandwidth, and duration, as well as power, can change significantly as the laser is tuned. In such cases, rearrangement of the prisms is necessary to maintain the same pulse characteristics from one tuning wavelength to the next. Consistency of such characteristics is advantageous in minimizing variables in applications of the laser. A third problem related to group-delay-dispersion compensating prisms is that as the intracavity beam path changes, the effective alignment of a resonator with respect to that beam path can also change, resulting in a change of power in the intracavity beam.

A result of these problems is that for many experiments wherein a tunable ultrafast laser is used, experimental progress is inhibited by a need for frequent readjustment of laser components to compensate for changes in laser output pulse characteristics resulting from tuning. Because of the complex nature and inter-relationship of the adjustments, such adjustments are best made by persons skilled in the art. Experimenters using the lasers often may not have such laser adjustment skills. It is believed that these problems provide a significant obstacle to applications of ultrashort pulse technology where broad wavelength scanning is required. It is believed that this obstacle can best be overcome by providing a tunable ultrafast laser wherein such adjustments could be made automatically.

In prior-art ultrafast laser configurations, providing an automated tuning arrangement that could automatically adjust a laser in response to a single tuning command would, at best, be extremely difficult, again due to the complex and transcendental inter-relationship of variables resulting from tuning adjustments. Even given sensors for measuring pulse wavelength, bandwidth and duration characteristics as well as laser output power, arriving at a reliable control algorithm to automatically make the required adjustments would be a formidable task. There is a need for an ultrafast laser arrangement which requires sufficiently few tuning adjustments that automatic operation can be simplified with automatic control preferably based on monitoring a single output parameter of the laser.

SUMMARY OF THE INVENTION

The present invention is directed to a laser comprising a laser resonator having a gain-medium located therein. The gain-medium, when energized, provides optical gain over a band of wavelengths characteristic of the gain-medium. The band of wavelengths is defined as a gain-bandwidth.

An optical pump is arranged to energize the gain-medium, thereby causing laser radiation to circulate within the laser resonator. An optical switch is located in the laser resonator and arranged such that the laser radiation circulates as sequence of pulses characterized by a center wavelength and a pulse-bandwidth.

A plurality of prisms is located in the laser resonator and arranged for providing group-delay dispersion compensation. At least one of the prisms is moveable such that the prisms have a selectively variable spatial relationship with each other. The spatial relationship is arranged such that pulses of different wavelengths within the gain-bandwidth, in passing through the prisms, are caused to follow different optical paths in the resonator.

A stop is configured and positioned in the resonator cooperative with the prisms to limit the different optical paths possible in the resonator such that only those of the pulses having a selected center wavelength can circulate in the resonator. The spatial relationship of the stop with the prisms is selected such that the circulating pulses follow a predetermined optical path-length therein.

An arrangement is provided for moving the at least one and any other movable prisms cooperative with the stop for varying the selected center wavelength of the pulses within the gain-bandwidth. The cooperative movement is arranged such that the predetermined optical path-length of the pulses in the prisms remains about the same as different pulse center wavelengths are selected by the prism motion.

In one aspect of the inventive laser, the optical switch is arranged for passive modelocking at a predetermined range of power of the circulating radiation. The laser includes an electronic controller arranged to control the cooperative movement arrangement. The controller is further arranged to vary power delivered by the optical pump to the gain-medium such that the circulating laser power remains within the predetermined range thereof as different center wavelengths of the pulses are selected.

In one preferred embodiment of the inventive laser there are two prisms. A first of the prisms is moveable with respect to the second and the stop is maintained in a fixed relationship with the first prism, the relationship being such that when the first prism is moved the stop is synchronously moved therewith.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the invention.

FIG. 1 schematically illustrates one preferred embodiment of a pulsed, tunable, ultrafast laser in accordance with the present invention, having a resonator including two dispersion-compensating prisms, one thereof moveable, together with an aperture, for tuning the laser.

FIG. 2 is a perspective view schematically illustrating one example of the moveable prism of FIG. 1 having the aperture of FIG. 1 defined on the surface of the prism.

DETAILED DESCRIPTION OF PREFERRED EMBODIMENTS

Figure 3:
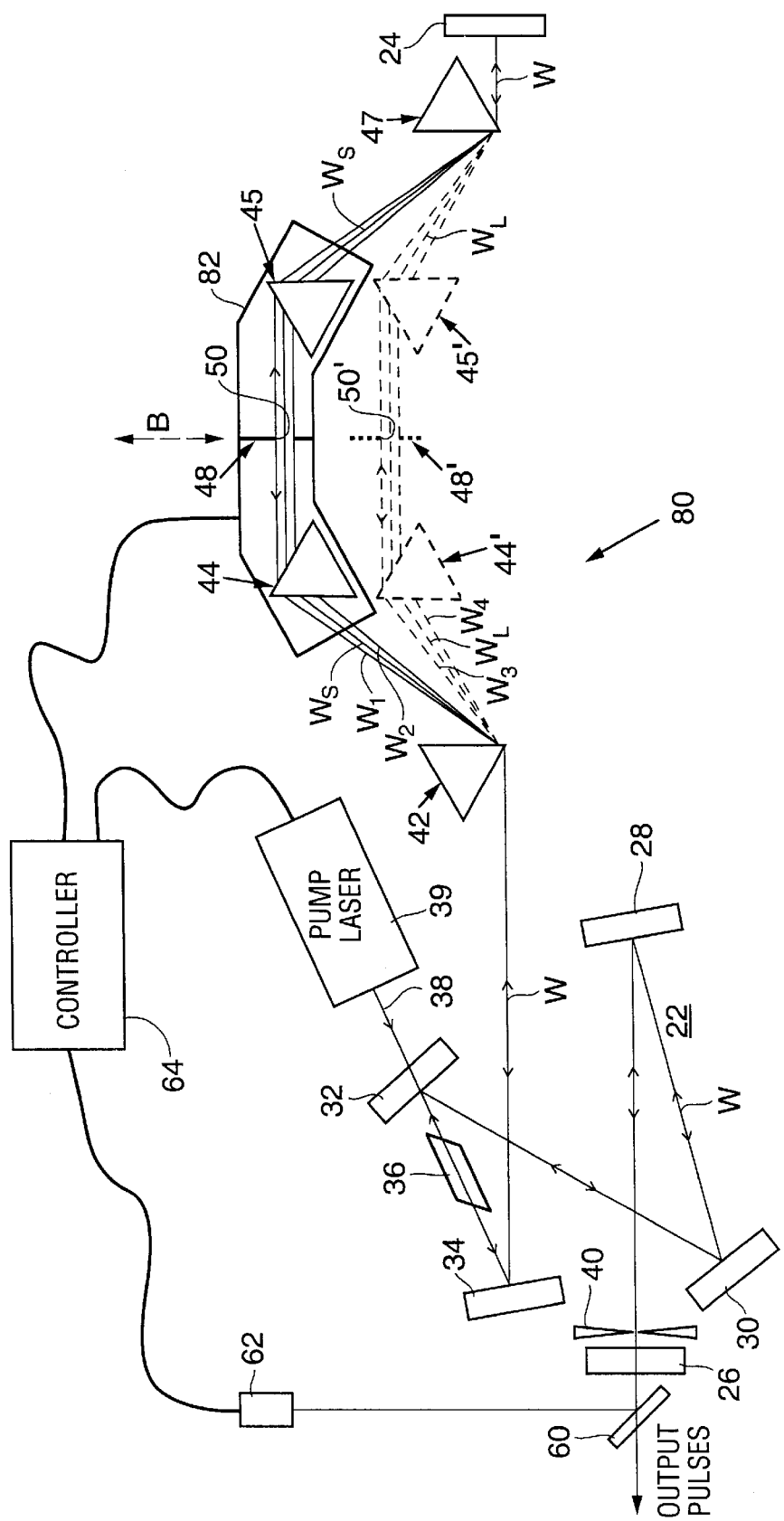
FIG. 3 schematically illustrates another preferred embodiment of a pulsed, tunable, ultrafast laser in accordance with the present invention having a resonator including four dispersion-compensating prisms, two thereof moveable, together with an aperture, for tuning the laser.

Turning now to the drawings, wherein like features are designated by like reference numerals, FIG. 1 schematically depicts a preferred embodiment 20 of a tunable ultrafast laser in accordance with the present invention. Laser 20 includes a laser-resonator 22 formed between a maximum reflecting mirror 24 and a partially transmitting, outcoupling mirror 26. Fold mirrors 28, 30, 32, and 34 serve to compact the physical "footprint" of laser 20, while still allowing a relatively long optical path length in the resonator, for example, an optical path length of about 1.0 meters (m) or greater between terminating mirrors 24 and 26 of the resonator.

An element of a solid-state gain-medium 36 is located between mirrors 32 and 34. Element 36 is optically pumped by light 38 delivered from a pump-light source 39, preferably a laser. By way of example, a diode-pumped frequency-doubled Nd:YAG or Nd:YVO$_4$ laser delivering light at a wavelength of 532 nm is a preferred pump-light source for pumping a Ti:sapphire gain-medium. Passive mode-locking of laser 20 is provided by an aperture 40 located in resonator 22 adjacent outcoupling mirror 26. In this arrangement, the Ti:Sapphire gain-medium itself, due to the Kerr effect, acts increasingly as a positive lens with increasing pumping time until the lens effect is sufficient that energy can circulate through aperture 40. Laser action is thereby initiated, and energy that is stored in the gain-medium is released by the resonator as a laser pulse. This mode-locking technique is described in detail in U.S. Pat. No. 5,097,772 incorporated herein by reference.

It should be noted, the that use of the preferred Kerr lens modelocking arrangement of laser 20 should not be considered as limiting. Pulsed-operation of the inventive laser may be provided by any well known "optical switch" arrangement passive or active, such as a saturated Bragg mirror, an acousto-optical switch or an electro-optical switch such as a Pockels cell.

Group-delay dispersion compensation is provided by prisms 42 and 44 located in resonator 22. The prisms are arranged with apexes 42A and 44A, respectively, thereof oppositely directed with respect to the path of laser light circulating in resonator 22. Between outcoupling mirror 26 and prism 42, laser light of all wavelengths in the tuning range of laser 20 follows the same path W. Between prism 42 and maximum reflecting mirror 24, prisms 42 and 44 cause wavelengths near the short and long wavelength ends of the tuning range to follow a path schematically designated respectively by solid line Ws and broken line WL.

In a modelocked, ultrafast laser light circulates in the resonator as a sequence of pulses at a very high frequency, for example, about 100 Megahertz (MHz). Each pulse includes a spectrum of wavelengths distributed around a nominal center wavelength at the maximum of the distribution. Because of this, a pulse can be characterized as having a bandwidth. The bandwidth is dependent, among other factors, on the duration of the pulse.

The pulse bandwidth is usually defined by the difference in wavelengths on either side of the center wavelength at which the pulse intensity is half of the maximum value in the pulse. In FIG. 1, these wavelengths follow paths designated by solid lines $W_1$ and $W_2$ (where $W_1$ is the shorter) for a pulse having a nominal wavelength following path $W_S$. For a pulse having a nominal wavelength following path WL, the bandwidth-defining wavelengths follow paths indicted by broken lines $W_3$ and $W_4$ where $W_3$ represents the shorter-wavelength path. It should be noted here that the relative path separations of the designated wavelengths are exaggerated in FIG. 1 to simplify illustration.

Pulse wavelengths incident on prism 42 along common path W are dispersed into wavelength-dependent diverging paths. These paths are intercepted by prism 44 which transforms the paths into parallel paths incident on mirror 24. Mirror 24 reflects the pulse wavelengths back along these same parallel paths to prism 44. After passing through prism 44 the wavelengths converge along their original divergent paths towards prism 42. Prism 42 recombines the wavelengths on common path toward mirror 26.

Prism 44 is mounted on a movable stage 46 operable automatically by a controller 64. Also mounted on stage 46, between prism 44 and mirror 24, is a spatial filter or aperture stop 48. Stop 48 has an aperture 50 therein. Aperture 50 is preferably a slit with the width of the slit arranged in the dispersion direction of the prisms.

Stop 48 is preferably configured such that only light having wavelengths which can pass through prisms 42 and 44, and also through aperture 50, can circulate in resonator 22. Aperture 50 has a width preferably no greater than that which is necessary to allow the spectral components of a pulse to pass through. Stop 48 is preferably oriented perpendicular to the beam path. The stop may also be positioned between prisms 42 and 44. It is also possible to incorporate stop 48 on prism 44 by making a selected area of the prism opaque as illustrated in FIG. 2. While physically convenient, this is arrangement may not produce an optimum result.

Stop 48 is positioned in a fixed spatial relationship with prism 44 such that aperture 50 of the stop defines a selected portion of the prism through which circulating radiation can pass. The portion selected defines (fixes) a particular optical path-length for light traversing the prisms. This path length, together with a longitudinal separation D between the prisms (path lengths between the prisms), is selected in consideration of group-delay dispersion compensation requirements, among other factors. General principles of using one or more prism-pairs for group delay dispersion control are well-known in the art. Accordingly, this path-length selection is not discussed in detail herein.

In examples wherein gain monotonically increases or decreases over a tuning range it may be possible to replace stop 48 with a knife edge arrangement. This arrangement would be arranged to prevent passage of wavelengths outside the pulse bandwidth at which gain increases. Lasing at wavelengths with lower gain would be limited by a natural tendency of the laser to lase at the wavelengths of highest gain.

Tuning of laser 20 is effected by moving stage 46, and prism 44 and stop 48 thereon in a direction indicated in FIG. 1 by broken line A, i.e., generally transverse to the direction of circulating radiation. The position of prism 44, stop 48 and aperture 50 in path $W_L$ is indicated by broken outlines 44', 48' and 50'. This motion of the prism and stop causes the nominal lasing wavelength to change, while the optical path-length of the lasing wavelengths within the prisms remains about the same. This minimizes changes in the characteristics of the laser output pulses as the laser is tuned. By way of example in a laser tunable in a range between about 700 and 900 nm, pulse bandwidth could be held within about ±50% of a nominal bandwidth over the tuning range.

In a Kerr-lens modelocked laser, modelocking can be maintained only while laser-pulse power circulating in the laser resonator remains within a range wherein the modelocking is effective. Accordingly, for a fixed pump power, the tuning range of laser 20 may be limited to a range of wavelengths (less than the useful gain-bandwidth of the gain-medium) for which the gain provided by gain element 36 is sufficient to provide the necessary laser-pulse power. One arrangement for extending the tuning range of the inventive laser is to provide a beamsplitter 60 arranged to divert a fraction of the output of laser 20 to a detector 62. Output of the detector 62 is monitored by controller 64 and interpreted as a measure of output power of laser 20 and, accordingly, circulating power in resonator 22 thereof. Controller 64 is arranged to modify pump-power provided by pump-light source 39 such that monitored output power, and accordingly circulating power, remains within a range of values necessary to maintain laser 20 in modelocked operation.

Optionally, mirror 24 may be provided with a mirror mount 66 including actuators 68 arranged to biaxially adjust the angular alignment of mirror 24 with respect to light circulating in resonator 22. Optimal alignment of the mirror may vary slightly as the laser 20 is tuned, due, for example, to factors such as mechanical tolerances of stage 46 and local slope variations across mirror 24. Controller 64 is arranged to control motion of actuators 68 responsive to a measurement of either pump-power supplied by pump-light source 39, or of the energy delivered to the pump light source to provide that pump-light power. Alignment can be optimized, for example by controller 64 adjusting actuators 68 until pump-light power required to provide a given output power at a given nominal lasing wavelength is minimized.

If automatic alignment control of mirror 24 is not required, it is possible, in theory at least, to dispense with output power monitoring and control pump-power with changing pulse wavelength by programming controller 64 with information representing the change of gain of gain-medium 36 with wavelength, if this is known. Such a method, however, may be subject to error due to time-related effects such as changes in the efficiency of resonator 22 resulting, for example, from deterioration of optical components thereof with use.

Nevertheless, by arranging stage 46 such that motion thereof can be controlled by controller 64, and providing at least an output-power control as described above, tuning of laser 20 can be effected in a "hands-off" (as far as optical components of the laser are concerned) mode by input of a simple wavelength command to controller 64. Controller 64 can also be commanded to continuously tune laser 20 over the useful gain-bandwidth of gain-element 36 while continuously maintaining modelocked operation of the laser.

In one example of laser 20, gain element 36 is a Ti:sapphire gain element. Pump light source 39 is a frequency-doubled Nd:YVO$_4$ laser delivering pump light at a wavelength of about 532 nm. Resonator 22 has a length of 180 centimeters. Prisms 42 and 44 are 60.5 degree isosceles prisms of SF6 glass. Length D is about 75.6 cm. Average angle of incidence of light on the prisms through the tuning range is 60.5 degrees. Mirror 24 is located at about 15.0 cm from prism 44 through the tuning range. Direction A is about perpendicular to the base of prism 44.

The exemplary inventive laser delivers modelocked pulses having a pulse-energy of 150 fs at 80 MHz and a pulse-duration of about 150 fs at a repetition rate of 80 MHz. Pulse bandwidth is about 7.0 nm at a center wavelength of 800 nm. Stage 46 is driven by controller 64. The exemplary laser can be commanded to tune continuously through an output (center) wavelength range from about 700 nm to 960 in about two minutes while still maintaining modelocked operation and while maintaining pulse bandwidth between about 5.0 and 10.0 nm.

Referring now to FIG. 3, another embodiment 80 of a tunable, ultrafast laser in accordance with the present invention is illustrated. Laser 80 is similar to laser 20 of FIG. 1 with an exception that group delay dispersion compensation is provided by four prisms 42, 44, 45, and 47. This provides more group-delay-dispersion compensation than the two-prism arrangement of laser 20, albeit at the expense of increased alignment complexity.

In the four-prism arrangement of laser 80, prism 42 disperses wavelength components of a circulating pulse into diverging paths, for example, into $W_1$, $W_S$ and $W_2$. Prism 44 is selected and arranged to render the diverging paths parallel, while still being spaced apart. Prism 45 converges the parallel paths, and prism 47 recombines the converging parallel paths into a common path W toward mirror 24. The reverse occurs for a pulse reflected by mirror 24, with prism 47 diverging the pulse components into diverging paths $W_1$, $W_S$ and $W_2$ and prism 42 recombining the pulses into a common path W toward mirror 26.

Prisms 44 and 45 are mounted on a moveable stage 82 with a stop 48 including aperture or slit 50 mounted between the prisms in a fixed relationship therewith. Tuning of laser 80 is effected by moving stage 80 in a direction, indicated by arrows B, perpendicular to the parallel paths of light between prisms 44 and 45. Broken outlines 44', 48' and 50' indicate the position of prisms 44, 45 and stop 48 as they are moved by stage 82 toward the path of longer wavelengths in the tuning range of laser 80.

Figure 4:
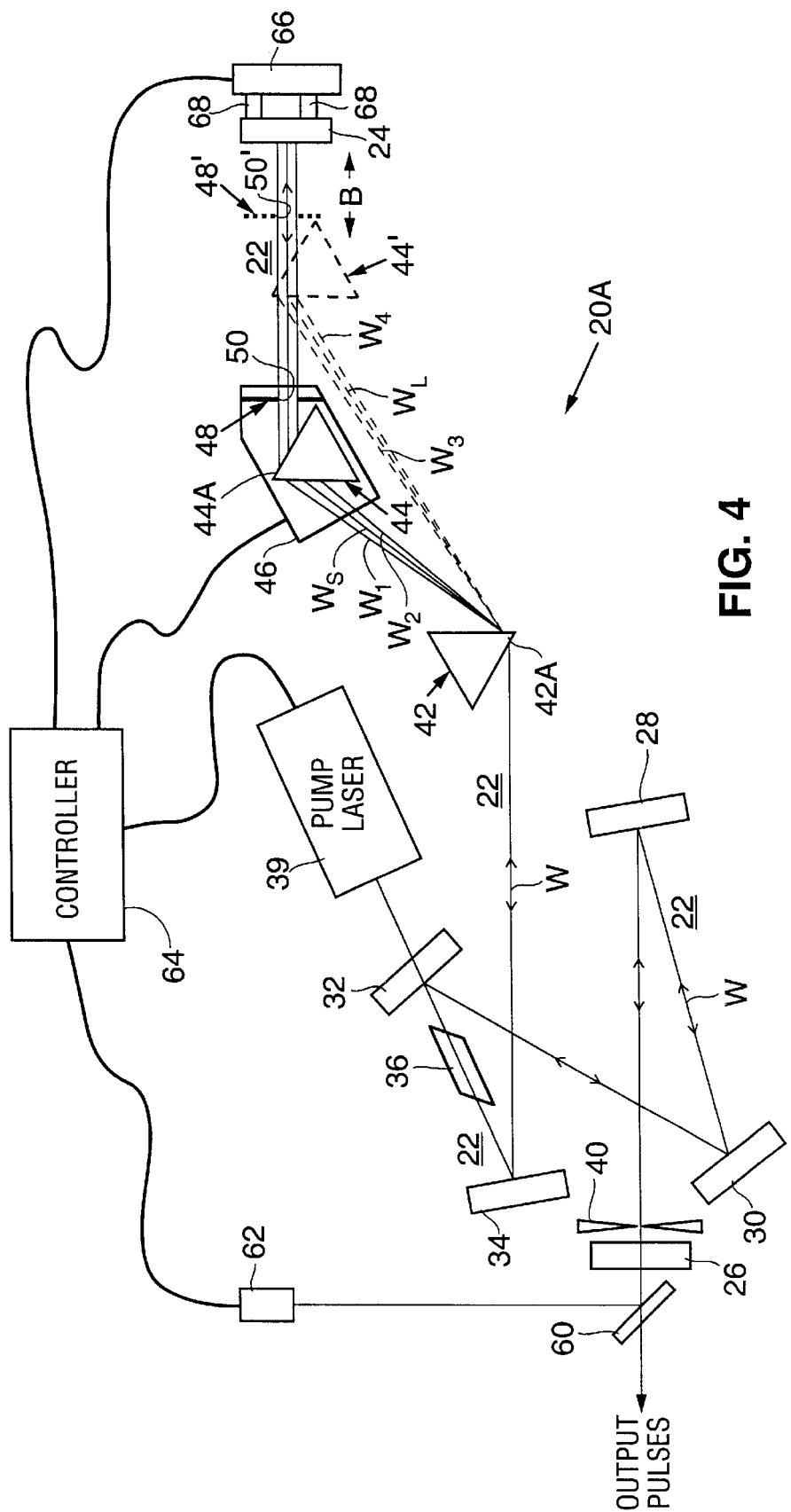
FIG. 4 schematically illustrates yet another preferred embodiment of a pulsed, tunable, ultrafast laser in accordance with the present invention, similar to the laser of FIG. 1 depicting one example of a prism motion scheme selected to minimize change in pulse bandwidth as the laser is tuned.

Referring now to FIG. 4, yet another embodiment 20A of an ultrafast laser in accordance with the present invention is illustrated. Laser 20A is similar to laser 20 of FIG. 1 with the exception that stage 46 is arranged to move prism 44 and stop 48 together in a direction parallel to direction of light circulating in resonator 22 between mirror 24 and prism 44, as indicated in FIG. 4 by arrows B. The position of prism 44, stop 48 and aperture 50 in path WL is indicated by broken outlines 44', 48' and 50'. As in laser 20, the movement changes the nominal pulse wavelength of the laser and keeps the path of laser radiation in the prisms constant as the laser is tuned. This motion has the effect of increasing the axial separation of prisms 42 and 44 as the laser is tuned to lase at longer wavelengths. In this embodiment, motion of stop 48 is not necessary, provided that the stop remains in a position which fixes the portion of prism 44 through which circulating laser radiation can pass. By way of the example, if position 48' is the position of the stop when laser 21A is tuned to the longest contemplated lasing wavelength thereof, the stop can remain in this position throughout the tuning range of motion of prism 44.

A result of this longitudinal motion is that group-delay-dispersion compensation provided by the prism-pair changes as the laser is tuned. The compensation change is such that this motion is more effective than the transverse motion of laser 20 in minimizing changes in characteristics of output pulses, particularly the pulse bandwidth, as the laser is tuned.

The motion of prism 44 parallel to the circulating beam direction also provides that the circulating radiation is also incident at the same position on mirror 24 independent of the selected pulse wavelength. This reduces the possibility of changes of resonator characteristics due to spatial variation of the characteristics of mirror 24 over its surface. A disadvantage is that the resonator must be made physically longer than that of laser 20 to accept a relatively long travel of the prism over the tuning range.

Figure 5:
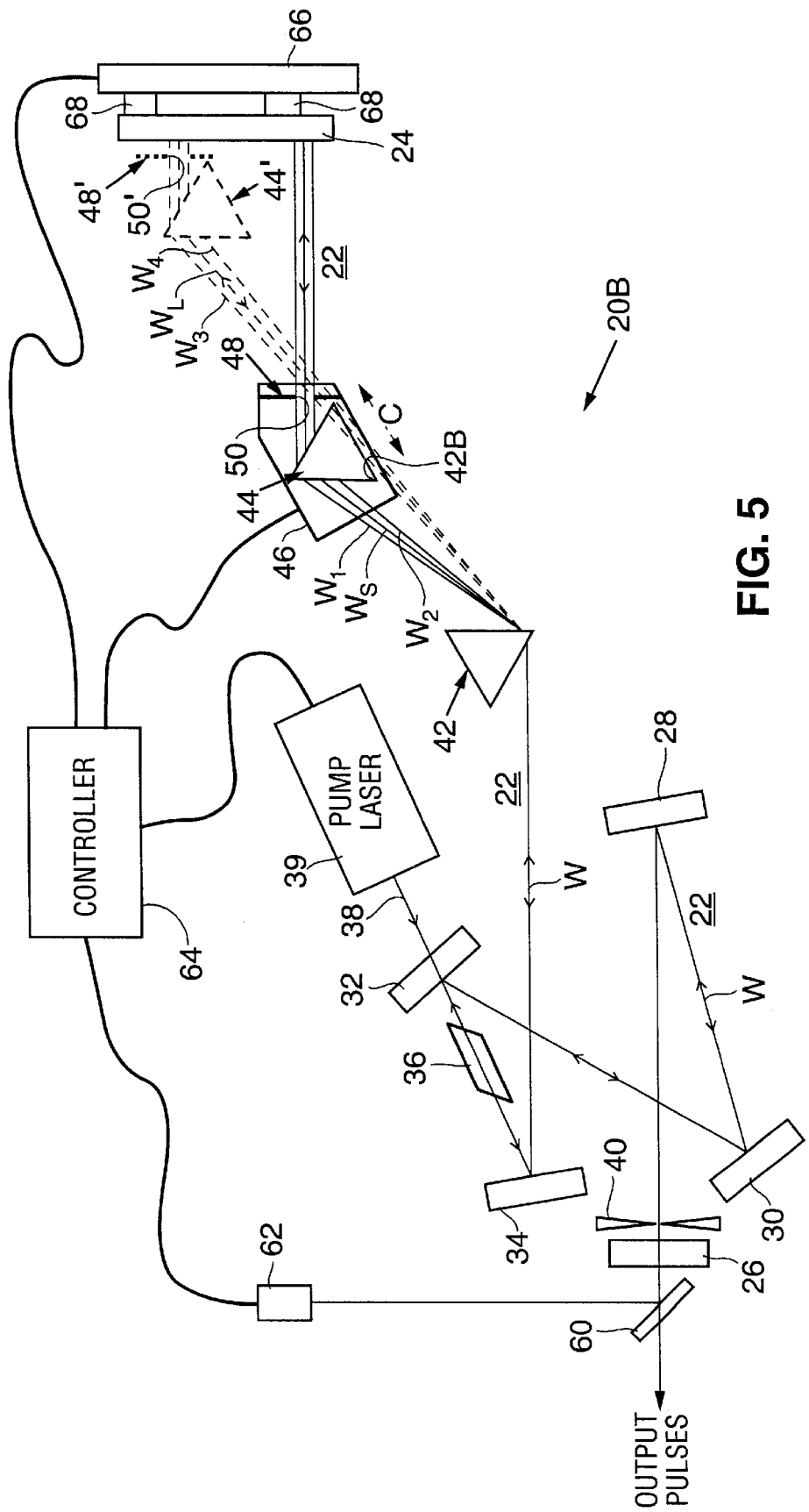
FIG. 5 schematically illustrates still another preferred embodiment of a pulsed, tunable, ultrafast laser in accordance with the present invention, similar to the laser of FIG. 1 depicting another example of a prism motion scheme selected to minimize change in pulse bandwidth as the laser is tuned.

Referring now to FIG. 5, still another embodiment 20B of an ultrafast laser in accordance with the present invention is illustrated. Laser 20B is similar to laser 20 of FIG. 1 with the exception that stage 46 is arranged to move prism 44 and stop 48 together in a direction parallel to the base 42B of prism 42, as indicated in FIG. 5 by arrows C. The position of prism 44, stop 48 and aperture 50 in path WL is indicated by broken outlines 44', 48' and 50'. This motion is a compound motion in which prism 44 is moved longitudinally and transversely in the resonator with respect to the direction of radiation circulating in resonator 22. As in laser 20, the movement changes the nominal pulse wavelength of the laser and keeps the path of laser radiation in the prisms constant as the laser is tuned. This has the effect of increasing the axial separation of prisms 42 and 44 as the laser is tuned to lase at longer wavelengths.

This compound motion is believed to be even more effective than that of laser 20A in minimizing changes in the characteristics of output pulses, particularly the pulse bandwidth, as the laser is tuned. The compound motion also has the disadvantage of requiring a longer resonator than that of laser 20, and also requires mirror 24 to be sufficiently wide to accommodate lateral shift of circulating radiation as the laser is tuned.

Those skilled in the art will recognize that that the prism motion arrangements of lasers 20A and 20B could be deployed in the four-prism arrangement of laser 80 of FIG. 3. Clearly, however, it would be necessary to provide separate moving arrangements for prisms 44 and 45. This would complicate synchronization of the prism motions with stop 80. Such an arrangement would also require even more elongation of the laser resonator than is required in lasers 20A and 20B.

From the description of preferred embodiments provided above, together with the referenced drawings, those skilled in the art will recognize without further illustration that further embodiments of the invention including more or less group-delay-dispersion compensating prisms, or different means of synchronously driving prisms and aperture stop arrangements, are possible without departing from the spirit and scope of the present invention. By way of example, in an embodiment similar to laser 80, it is possible to mount prisms 44 and 45 on separate stages, with stop 48 fixedly related to either one of the prisms on its stages, and drive the stages synchronously in a direction along the axis of symmetry of the mounted prism.

In theory at least, more group-delay-dispersion compensating prisms may be added, in one or more pairs, with one prism in each pair moveable, to a laser similar to laser 80. All moveable prisms must, however, still be moved cooperative with wavelength defining stop 48 such that the optical path of a pulse, i.e., of wavelength components of a pulse, through the prisms has about the same length as different pulse center-wavelengths selected by the prism motion.

Further by way of example, again in theory at least, three or more prisms may be used to achieve a similar optical result to that achieved by prisms 42 and 44 in lasers 20 or 80. Here, of course it would be necessary to provide for synchronous, separate movements of two or more of the prisms cooperative with the stop arrangement. The separate prism movements would, of course need to be different (dependent on the distance of the prism being moved from the fixed prism) to provide that the optical path of a pulse through the prisms has about the same length for all pulse center-wavelengths selected by the synchronous motion.

The laser of the present invention is described above with reference to a preferred and other embodiments. The invention is not limited, however, to the embodiments described and depicted. Rather, the present invention is limited only by the claims appended hereto.

What is claimed is:

1. A laser, comprising:
   a laser resonator formed between first and second mirrors:
   a gain-medium located in said laser resonator, said gain-medium, when energized, providing optical gain over a band of wavelengths characteristic of said gain-medium, said band of wavelengths defined as a gain-bandwidth;
   an optical pump arranged to energize said gain-medium, causing laser radiation to circulate within said laser resonator;
   an optical switch located in said laser resonator and arranged such that said laser radiation circulates as sequence of pulses, each thereof having a center wavelength;

first and second prisms located in said laser resonator between said gain-medium and said first mirror;

said second prism being positioned to receive laser radiation from said gain-medium and disperse the radiation along wavelength-dependent diverging paths and said first prism positioned to intercept radiation dispersed by said second prism;

a physical stop mounted in a fixed spatial relationship with said first prism and positioned with respect to said first prism such that said intercepted laser radiation can pass through said first prism in only a predetermined fixed region thereof thereby defining a limited range of wavelengths within said gain bandwidth of said gain-medium that can circulate in said resonator, the spatial relationship of said second prism and said assembly of said first prism and said stop determining which wavelengths are in said limited range thereof and thereby determining the center wavelength of pulses circulating in said resonator; and wherein said assembly of said first prism and said stop is moveable with respect to said second prism for varying said spatial relationship between said second prism and said assembly, thereby varying said center wavelength of said pulses within said gain-bandwidth the fixed spatial relationship of said first prism and said stop providing that as said center wavelength is varied optical path-length of said pulses in said prisms is the same.

2. The laser of claim 1, wherein said first prism transforms said wavelength-dependent diverging paths into parallel paths directed onto said first mirror said first mirror being aligned with said parallel paths such that said wavelength components are reflected back to said first prism in an opposite direction along the same parallel paths.

3. The laser of claim 2, wherein said optical switch is arranged for passive modelocking at a predetermined range of power of said circulating laser radiation, wherein said prism and stop assembly is mounted on a movable stage, and wherein the laser further includes an electronic controller connected to said movable stage for controlling movement thereof, said controller being further connected to said optical pump for controlling the energizing of said gain-medium such that said circulating laser radiation power remains within said predetermined range thereof the center of said pulses is varied.

4. The laser of claim 2, wherein said first mirror is alignable by an alignment mechanism connected therewith and said controller is connected with said alignment mechanism to maintain said first mirror in said alignment with said parallel paths while different pulse center wavelengths are selected by moving said assembly of said first prism and said stop.

5. A laser, comprising:

a laser resonator defined by first and second mirrors:

a gain-medium located in said laser resonator, an optical pump for energizing said gain-medium to generate laser radiation, means for causing the laser to operate in a mode-locked manner;

first and second prisms located in said laser resonator between said gain-medium and said first mirror, said second prism being positioned to receive laser radiation from said gain-medium and disperse the radiation as a function of wavelength, said first prism positioned to intercept radiation dispersed by said second prism;

a physical stop mounted in a fixed spatial relationship with respect to said first prism and positioned to transmit a portion of the laser radiation transmitted by the first prism; and a stage for moving the first prism and stop together so that the portion of the laser radiation transmitted by the stop is varied to vary the center wavelength of the laser radiation circulating in the resonator.

6. The laser of claim 5, wherein said laser radiation transmitted by said first prism and directed towards said stop travels along parallel paths directed onto said first mirror, said first mirror being aligned with said parallel paths such that said wavelength components are reflected back to said first prism in an opposite direction along the same parallel paths.

* * * * *